Patented Jan. 9, 1951

2,537,577

UNITED STATES PATENT OFFICE 2,537,577

SELECTIVE OXIDATION PROCESS FOR PRODUCING FATTY ACIDS AND ALCOHOLS

Egi V. Fasce, Baton Rouge, La., assignor to Standard Oil Development Company, a corporation of Delaware No Drawing. Application November 10, 1948, Serial No. 59,421

5 Claims. (Cl. 260—413)

This invention relates to a novel, oxidation reaction for synthetic organic products such as those which are formed by various hydrocarbon synthesis reactions and particularly by oxo synthesis reactions. The invention is particularly useful for preparation of good quality alcohols and gives hydroxylated products from which relatively undesirable impurities have been removed.

As is well-known in the art, many of these synthetic processes give complex mixtures of compounds having various carbon structures in the molecules. While it is, of course, sometimes possible to separate many of these mixtures into specific components and narrow fractions by distillation, solvent extraction and the like, many separations which would be highly desirable, especially from the standpoint of obtaining substantially pure homogeneous fractions of relatively pure compounds are impossible using the presently known methods. This is particularly true in cases where it is desirable to isolate components of mixtures according to whether they have branched or straight chain carbon structures. This separation may be of the greatest importance in some instances, where the carbon structure bears a direct relationship to the usefulness of the material.

It has now been discovered that separation based at least partially on carbon skeleton structures can be made by a specific and selective oxidation process which preferentially reacts with the materials present as impurities to form from them various carboxylic compounds and, at the same time, yielding non-acidic compounds, mainly alcohols, from the aldehydes and alcohols having more nearly straight chain structures. The acidic carboxylic compounds can then be separated from the relatively neutral components by relatively simple and effective methods as by caustic extraction.

This selective oxidation reaction can be applied to various synthetic aldehyde-containing fractions which may contain alcohols, olefins and other compounds and is best adapted for relatively narrow boiling cuts. In general, the starting feed mixtures are composed of compounds having at least six carbon atoms. Such fractions might be obtained, for example, by the Fischer synthesis from carbon monoxide and hydrogen over catalysts containing iron group metals such as iron, nickel, or cobalt. The process can also be applied to products of the so-called oxo synthesis. These products are formed by reaction of carbon monoxide and hydrogen with olefins over catalysts of the same type as those used in the hydrocarbon synthesis reaction, but preferably cobalt containing catalysts. These oxo synthesis products include the aldehydes which are the initial reaction products of the olefin with carbon monoxide and hydrogen, and also the alcohols which may be obtained by the subsequent reduction of such aldehydes. Other compounds such as acetals, hemiacetals and esters may also be present. The oxidation of this invention is generally applicable to all types of mixtures of aldehydes containing olefins, alcohols and other compounds such as are obtained as products in the hydrocarbon synthesis and oxo reactions.

It is to be understood that wherever the expression aldehyde product is used in this specification, it refers either to the aldehydes from an oxo synthesis reaction which may contain more or less amounts of olefins, alcohols, acetals and hemiacetals or to possible mixture of these products containing considerable aldehydes such as are derivable from the types of synthetic processes hereinbefore described. In general, the mixtures which yield themselves best to this type of reaction, wherein substantial amounts of relatively straight chain alcohols are obtained are those containing rather large amounts of aldehyde compounds.

These synthetic fractions may be treated in numerous ways prior to subjecting them to this selective oxidation treatment. For instance, they may be fractionated by distillation, solvent extraction, or some other type of selective process, and they may be washed with various treating agents. Certain treatment methods such as acid and alkali washes, and further heating are of advantage to give better quality feed stocks particularly in feed stocks having a high olefin content.

This selective oxidation should preferably be carried out under specific and controlled conditions in order to get the proper degree of oxidation which may be required for a good selectivity between the branched and straight chain compounds.

The feed stocks which can be employed may differ quite widely in composition but the yields obtainable therefrom differ only very slightly when comparable reaction conditions are employed.

In general, oxidized products consisting of about 20–35% of fatty acids and 20–50% of a mixture of hydroxy and carbonyl compounds are obtained when the process is carried out under optimum conditions. Composition of feed stock may, of course, necessitate some variation in conditions to get optimum results.

It has been found that the selective oxidation can be quite satisfactorily carried out with air or oxygen-containing gas at temperatures ranging from 80° F. to about 200° F. Low temperatures, 100–160° F. in general, produce less acidic products and a correspondingly higher yield of non-saponifiable material. The products from low temperature reactions are usually of better quality.

Fractions containing larger amounts of aldehydes have been found to give better results in such low temperature oxidations than do fractions having higher concentrations of olefins.

Higher temperatures give less selectivity and poorer quality products. Superatmospheric pressures of 15–500 p. s. i. g. may be employed if desired. The rate of feed of oxidizing gas when air was employed to oxidize an aldehyde fraction was found to be best at 48–50 l./hr./100 gms. of feed.

The catalysts which may be used include any one or a mixture selected from well-known types of metallic soaps which have been previously employed as oxidation type catalysts. Various examples of such compounds are cobalt oleate, cobalt stearate, copper stearate, manganese stearate, and the like. The soap type catalysts may be added as such or they may be prepared in situ by the addition of the appropriate metallic salts to fatty acids. The particular metallic soap employed is not critical in any way although variations in the kind of catalyst used may necessitate certain changes in the operation of the oxidation in order to get the optimum conditions. One important advantage of this invention is that it is not necessary to use pure soap compounds as catalysts since mixtures and impure products can be quite successfully employed.

Relatively small amounts of catalysts are necessary for the reaction, the exact amounts depending somewhat on the other conditions of operation and on the composition of the feed. In general, it has been found that 0.2% to 1.0% by weight of the metallic soap catalyst represents a very satisfactory concentration.

The crude products so formed from the selective oxidation may be worked up and the desirable fractions isolated and purified in any suitable manner. The crude mixture may be treated with caustic to form soaps of the fatty acid products. An inert solvent such as petroleum ether or the like can then be used to extract the non-saponifiable portion of the reaction product. The crude acids can be easily isolated from the soap solution by acidification and subsequent extraction. They can then be purified in any way as by distillation if desirable. A pure alcohol fraction can be obtained from the petroleum ether extraction in any suitable manner. One very selective method which gives an alcohol product of very good purity includes the esterification of the alcohols with boric acid, hydrolysis of the boric acid esters, and distillation of the alcohols. This purified product is of very good color and shows generally very satisfactory physical and chemical properties.

Products obtained as the separate fractions by this oxidation process may be utilized as such or they may be converted into other useful derivatives as desired. The acidic fraction comprising a mixture of carboxylic acids can, for informing the corresponding soaps. The acids can be converted to any kind of derivative of the carboxylic group, as for instance, an ester or an amide.

The non-saponifiable alcohol-aldehyde fractions which contain relatively a much higher percentage of the straight chain compounds than did the original feed can likewise be treated in a number of different ways. Certain compounds derived from hydrocarbon structures having straight chains are of especial value when employed in lubricating oil additives, detergents, wetting agents and other useful products. For instance, this non-acid fraction having generally a relatively high percentage of straight chain compounds can be hydrogenated over a suitable catalyst to form an alcohol fraction of good quality.

*Example I*

A crude aldehyde fraction obtained by carrying out the oxo reaction on a mixed olefin cut of boiling ranges 400–450° F. was subjected to a selective liquid phase oxidation in the presence of about 1% by weight of cobalt oleate using air as the oxidizing agent. The oxidation reaction was carried out for five to six hours at about 140° F. and with an air feed rate of 48–50 l./hr/100 gm. of feed. The resulting crude oxidation product was found to contain 14–20% by weight of crude fatty acids predominantly in the range $C_6$–$C_{14}$ and 78–80% of unsaponifiable material containing considerable amounts of $C_{10}C_{14}$ alcohols which appear to be substantially straight chain. The yields are based on the amount of crude aldehyde feed stock used in the oxidation. The crude product was worked up by saponification with 10–15% caustic solution for three hours at 220–230° F. and extraction of the unsaponifiable fraction with petroleum ether. The soap layer was acidified with 10% sulfuric acid and the free acids extracted with an organic solvent. The crude acids were recovered by fractionation to remove the solvent. The non-saponifiable fraction containing predominantly the alcohols and aldehydes was isolated from the petroleum ether extraction step by distillation. If desired, a preliminary hydrogenation can be carried out to eliminate carbonyl groups and give essentially only hydroxylated compounds. If desired, these alcohols may be further purified by conversion to a suitable derivative such as the boric acid ester and such derivative later hydrolyzed.

*Example II*

An aldehyde feed stock from the oxo reaction such as that used in Example I was subjected to a selective liquid phase oxidation with air in the presence of about 1% cobalt oleate. The oxidation was carried out for 5 to 7 hours at a temperature of 180° F. The crude products from this oxidation were worked up in a fashion similar to that employed for the product obtained in Example I. The fatty acid fraction obtained formed a somehat larger proportion of the total product than did the acids obtained in Example I. Here, at the higher temperature, an amount corresponding to about 33% of the total yield was found to be acidic material. There was a corresponding lowering of the alcohol-aldehyde fraction. At the higher oxidation temperature the odor and color of the acid fraction are appreciably inferior to those of acids obtained at lower oxidation temperatures. This tends to indicate that at higher temperatures, the reactions be- In case it is desired to obtain the oxidation products or to get a certain degree of selectivity of fractions without first preparing the aldehyde as by the catalytic reaction of the olefin feed with carbon monoxide and hydrogen, some selectivity may be obtained by oxidizing a fraction containing a high percentage of olefins and preferably boiling in relatively narrow ranges such as 400-450° F. and 500-550° F. Such an oxidation usually requires more drastic conditions particularly higher oxidation temperatures and may give somewhat inferior quality products.

There can also be employed as feed stock fractions having high alcohol content such as may be obtained by partial or total hydrogenation of the aldehyde fraction from the oxo synthesis reaction. These give results somewhat similar to the aldehydes.

I claim:

1. A selective liquid phase oxidation process which comprises oxidizing an organic mixture derived from the oxo process, said mixture having a relatively high aldehyde content and containing substantial amounts of olefins and alcohols, there being present both branched chain and straight chain compounds, with an oxygen-containing gas at temperatures from 80° to 200° F. in the presence of a small amount of a metallic soap oxidation catalyst, whereby a reaction mixture is obtained in which the more branched chain aldehydes, olefins, and alcohols are converted to acidic bodies and the more straight chain aldehydes, olefins, and alcohols are converted to neutral bodies, saponifying said reaction mixture to convert the acidic bodies to the corresponding soaps, extracting the non-saponifiable neutral bodies, acidifying the soaps, and recovering the free acidic bodies from the acidified mixture.

2. A selective liquid phase oxidation process which comprises oxidizing an impure oxo aldehyde mixture containing olefins and alcohols, said mixture containing both branched chain and straight chain compounds, with air in the presence of a catalytic amount of a metallic soap oxidation catalyst at temperatures from 80° to 200° F., from which there is obtained a mixture containing acidic products formed predominantly from the more branched chain compounds and neutral products containing the less branched chain compounds, saponifying the mixture to convert the acidic products to the corresponding soaps, separating the neutral products from the saponified mixture, acidifying the soaps, and separating free acidic products from the acidified mixture.

3. A selective liquid phase oxidation process which comprises oxidizing an organic mixture containing substantial amounts of aldehydes, olefins and alcohols, of both branched chain and straight chain types, said organic mixture being obtained by the catalytic reaction of a mixture of carbon monoxide and hydrogen with olefins, with air in the presence of a metallic soap oxidation catalyst at a temperature of 100°-160° F., whereby one portion of said total organic mixture is converted to a mixture of carboxy compounds derived from the more branched chain type aldehydes, olefins, and alcohols, and a second portion of said total organic mixture is converted to a mixture of neutral compounds derived from the more straight chain type aldehydes, olefins, and alcohols, saponifying the carboxy compounds with caustic to produce the corresponding soaps, extracting the unsaponfiable neutral compounds from the soaps, acidifying the soaps, and recovering the free carboxy compounds from the acidified mixture.

4. A process according to claim 3 in which the carboxy compounds produced are fatty acids predominantly in the range of $C_6$-$C_{14}$ and the unsaponifiable neutral compounds are alcohols predominantly in the range of $C_{10}$-$C_{14}$.

5. A process according to claim 3 in which the metallic soap oxidation catalyst is cobalt oleate.

EGI V. FASCE.

REFERENCES CITED

The following references are of record in the file of this patent:

UNITED STATES PATENTS

| Number | Name | Date |
| --- | --- | --- |
| 2,010,358 | Groll et al. | Aug. 6, 1935 |
| 2,115,892 | Toussaint | May 3, 1938 |
| 2,212,900 | Groll et al. | Aug. 27, 1940 |
| 2,355,140 | Bludworth | Aug. 8, 1944 |
| 2,444,399 | Duval et al. | June 29, 1948 |
| 2,470,859 | Pavlic | May 24, 1949 |